(12) United States Patent
Saint-Hilaire et al.

(10) Patent No.: US 9,774,686 B1
(45) Date of Patent: Sep. 26, 2017

(54) TRANSACTION TRACKING AND MONITORING

(71) Applicant: Verizon Patent and Licensing Inc., Arlington, VA (US)

(72) Inventors: Hector Saint-Hilaire, Waltham, MA (US); Dahai Ren, Lincoln, MA (US); Shuai Wu, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/081,049

(22) Filed: Mar. 25, 2016

(51) Int. Cl.
| | |
|---|---|
| *G08B 1/00* | (2006.01) |
| *H04L 29/08* | (2006.01) |
| *G08B 21/18* | (2006.01) |
| *G08B 5/36* | (2006.01) |

(52) U.S. Cl.
CPC .............. *H04L 67/125* (2013.01); *G08B 5/36* (2013.01); *G08B 21/182* (2013.01); *G08B 21/187* (2013.01)

(58) Field of Classification Search
CPC .............................. H04L 67/125; G08B 21/18
USPC ............................ 340/531, 506, 523, 539.13
See application file for complete search history.

(56) References Cited

U.S. PATENT DOCUMENTS

| | | | | |
|---|---|---|---|---|
| 6,055,521 A | * | 4/2000 | Ramsey | G06Q 50/06 222/2 |
| 8,924,267 B1 | * | 12/2014 | Terranova | G06Q 20/341 705/35 |
| 2003/0041330 A1 | * | 2/2003 | Smith | B67D 7/068 725/105 |
| 2012/0054246 A1 | * | 3/2012 | Fischer | G06Q 10/06 707/793 |

* cited by examiner

*Primary Examiner* — Phung Nguyen (57) ABSTRACT

A device may generate one or more objects for one or more transactions. The one or more transactions may include a sequence of one or more events. The one or more objects may include one or more states associated with the sequence of one or more events. The device may receive information associated with the one or more transactions. The information may be used to update the one or more states of the one or more objects. The device may detect one or more alerts based on the one of more objects. The one or more alerts may be associated with the one or more states of the one or more objects. The device may determine an alarm status based on the one or more alerts and may provide information to cause an action to be performed.

20 Claims, 10 Drawing Sheets

TRANSACTION TRACKING AND MONITORING

BACKGROUND

A monitoring system may continuously monitor a network, and may notify a network administrator in the event of a device failure, a network outage, or another issue. Additionally, transaction monitoring may include the monitoring of items associated with a transaction.

DETAILED DESCRIPTION OF PREFERRED EMBODIMENTS

The following detailed description of example implementations refers to the accompanying drawings. The same reference numbers in different drawings may identify the same or similar elements.

A monitoring system may monitor a system based on periodically sampling various variables that reflect a health of the system, and may ensure that the variables are within a particular range. Such a strategy may inadequately address particular issues associated with the system. For example, a system administrator may realize particular issues in an untimely manner or may fail to realize particular issues with the system entirely. Implementations described herein may assist a monitoring device in monitoring a system and identifying particular issues with the system. Additionally, implementations described herein may assist a monitoring device in providing detailed information, associated with the issue, to a system administrator.

In this way, implementations described herein may assist a monitoring device in diagnosing particular issues with a system, which may allow the particular issues to be rectified. Thereby, implementations described herein may conserve processor and/or memory resources associated with system devices, and may conserve network resources by reducing a quantity of time associated with rectifying system issues.

Figure 1A:
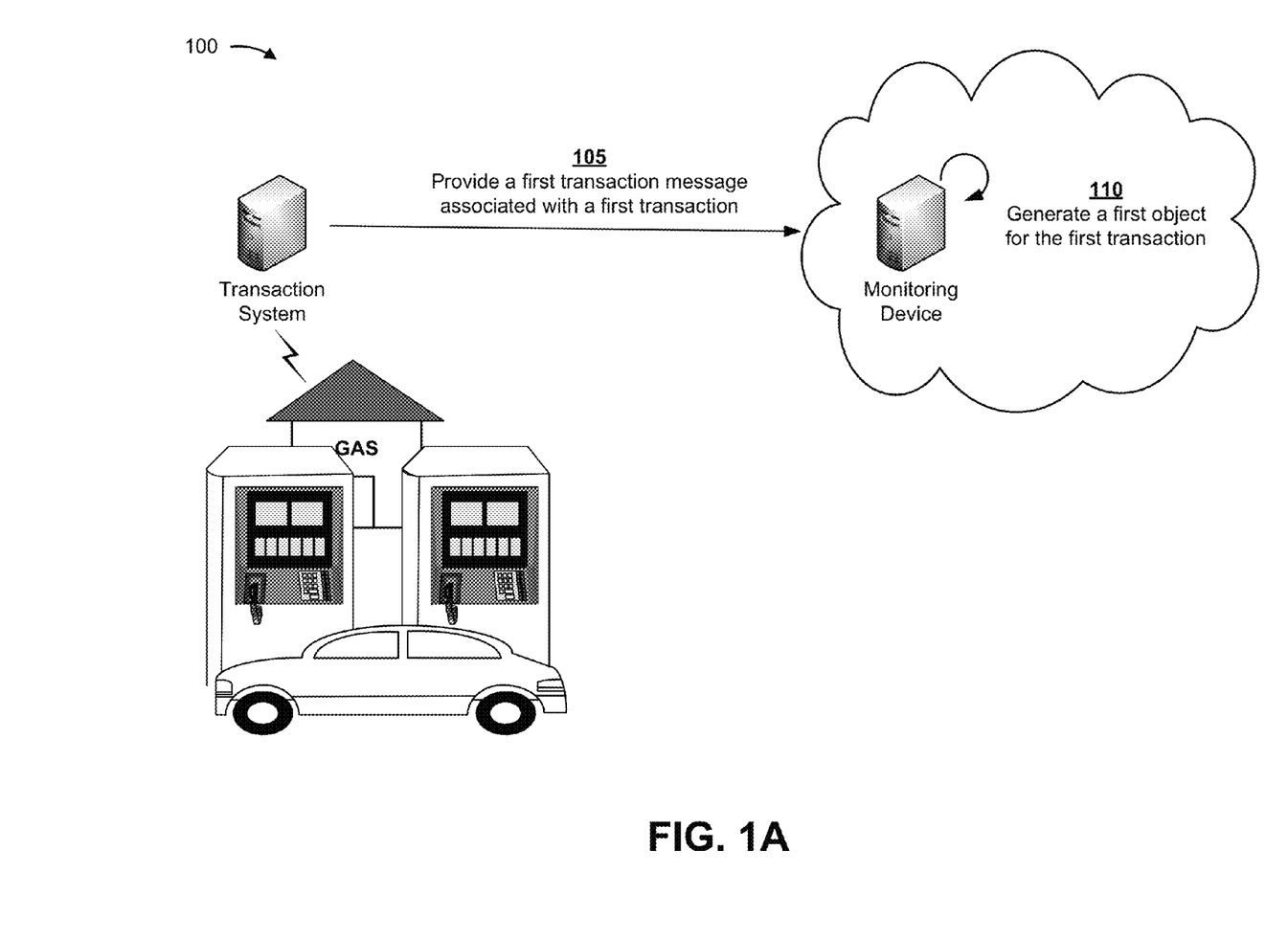
FIGS. 1A-1G are diagrams of an overview of an example implementation described herein.

FIGS. 1A-1G are diagrams of an overview of an example implementation 100 described herein. As shown in FIG. 1A, and by reference number 105, a transaction system (e.g., a server device) may provide, to a monitoring device (e.g., a server device), a first transaction message associated with a first transaction. For example, a transaction may include a sequence of one or more events. As an example, assume that a transaction associated with the transaction system in FIGS. 1A-1G includes five events. For example, the first event may include a vehicle arriving at a gas pump, the second event may include a user paying for gasoline, the third event may include dispensing of gasoline, the fourth event may include a stop in the dispensing of gasoline, and the fifth step may include the vehicle leaving the gas pump.

In some implementations, a transaction may be associated with a particular sequence of events and/or each event associated with the transaction may be associated with a particular timeframe. In some implementations, a transaction may be normal (e.g., the sequence of events may occur in an expected order and/or each event may occur within an expected timeframe). Alternatively, a transaction may be abnormal (e.g., the sequence of events may occur in an unexpected order and/or one or more events may occur within an unexpected timeframe). The monitoring device may monitor a transaction and identify whether the transaction is normal or abnormal. The transaction system may provide transaction messages (e.g., information that identifies a start, an end, or the like, of a particular transaction and/or one or more events associated with the particular transaction) to the monitoring device, which may enable the monitoring device to determine whether the transaction is normal or abnormal.

For example, as shown in FIG. 1A, and by reference number 110, the monitoring device may generate a first object for the first transaction. An object may include a data structure (e.g., a state machine) that is capable of being associated with one or more states. In some implementations, the object may include states that correspond to events associated with a transaction. For example, the transaction system may provide the first transaction message that identifies that a vehicle has arrived at a gas pump. The monitoring device may generate a first object to monitor the first transaction. For example, the first object may be associated with an initial state (e.g., corresponding to the first event).

In some implementations, an object may be associated with a normal state or an abnormal state. For example, a normal state may indicate that the transaction is normal, whereas an abnormal state may indicate that the transaction is abnormal. As an example, the first object associated with the first transaction may be associated with the initial state for a particular quantity of time (e.g., one minute or five minutes). For example, the second event (e.g., payment for the gasoline) may be expected to occur within one minute (e.g., if the user pays via credit at the gas pump), or within five minutes (e.g., if the user pays at a register of the gas station) of the first event. Thus, an expected timeframe for the first event may depend on a method of the second event.

Figure 1B:
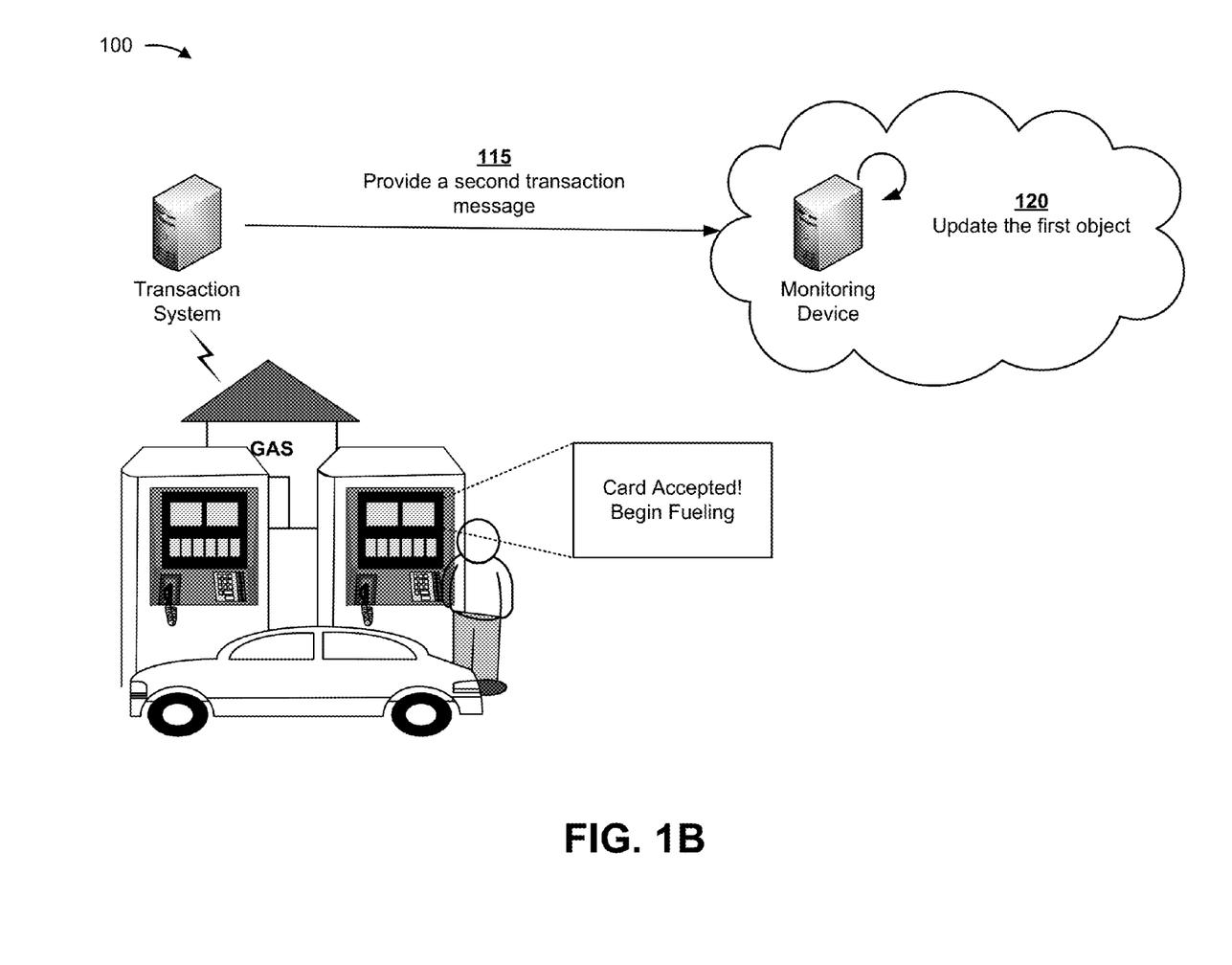

As shown in FIG. 1B, and by reference number 115, the transaction system may provide a second transaction message to the monitoring device. For example, the second transaction message may identify that the user has paid for gasoline (e.g., the second event has started). For example, assume that the user paid for the gasoline via credit card within one minute of arriving at the gas pump. As shown by reference number 120, the monitoring device may update the first object. For example, the monitoring device may update a state associated with the first object. Further, the first object may transition to a second state that identifies that the first transaction is associated with the second event. For example, the object may be associated with the second state for a particular quantity of time (e.g., five minutes). Further, the third event may be expected to occur within five minutes of the second event.

Figure 1C:
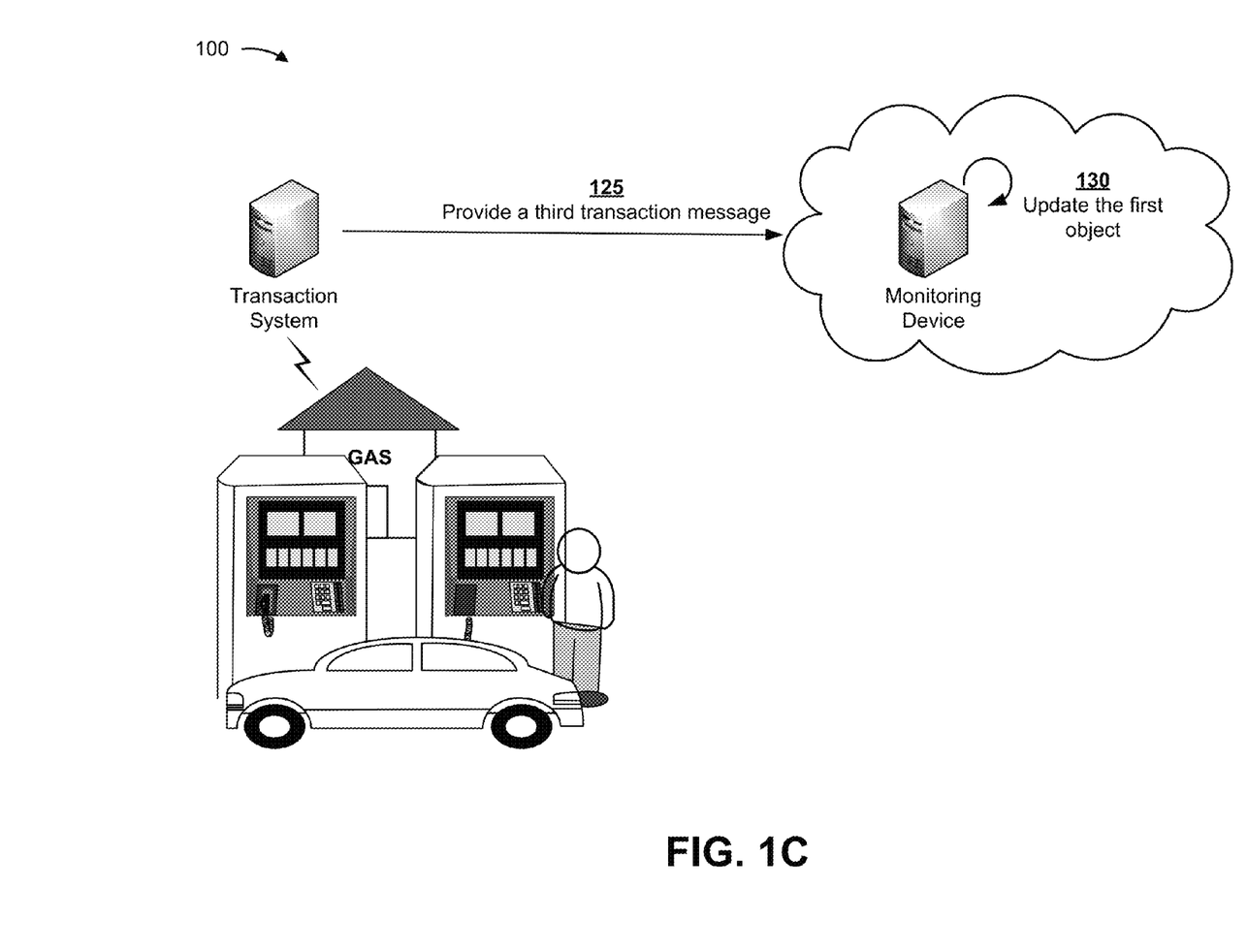

As shown in FIG. 1C, and by reference number 125, the transaction system may provide a third transaction message to the monitoring device. For example, the third transaction message may identify that the gas pump has started dispensing gasoline (e.g., the third event has started). For example, assume that the gas pump started dispensing gasoline within five minutes of the user paying for the gasoline. As shown by reference number 130, the monitoring device may update the first object. For example, the object may transition to a third state that identifies that the first transaction is associated with the third event. Further, the fourth event may be expected to occur within two minutes of the third event.

Figure 1D:
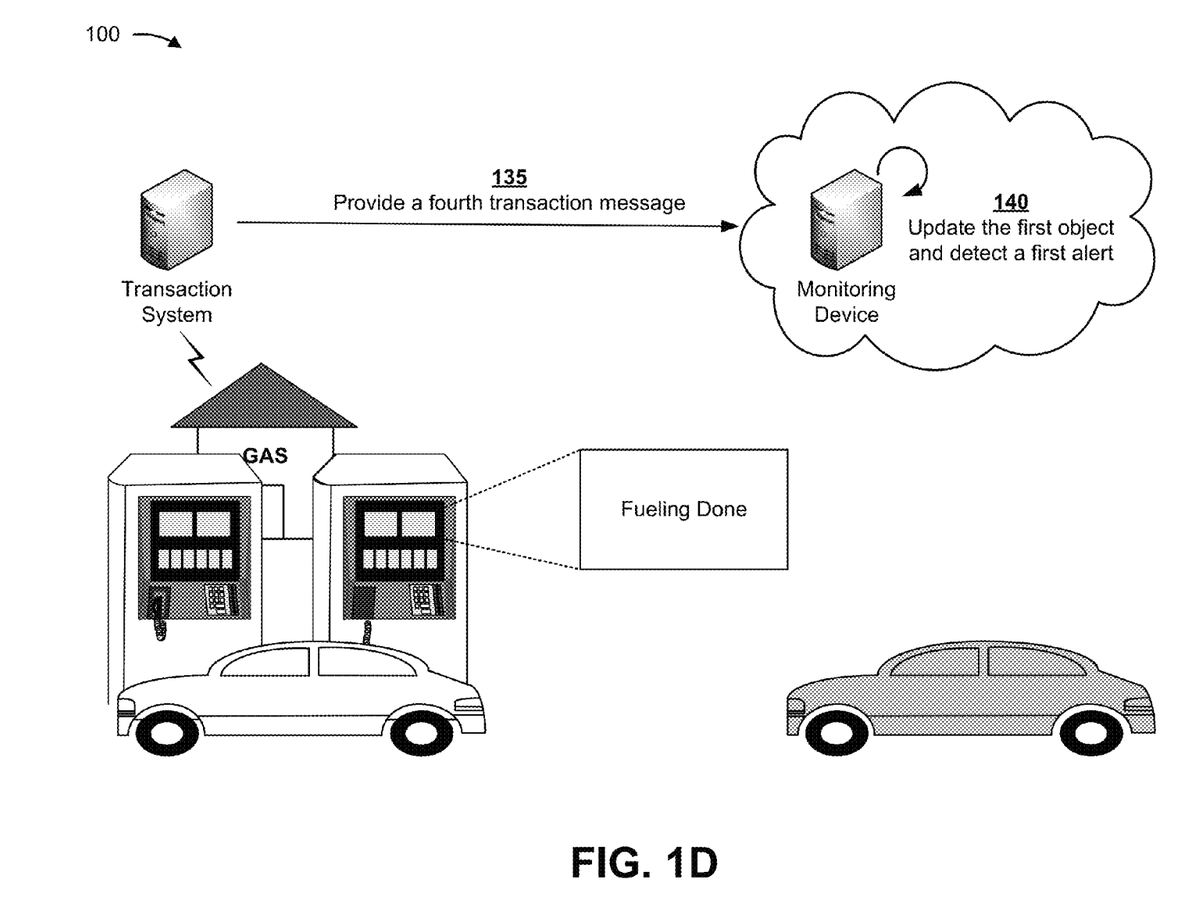

As shown in FIG. 1D, and by reference number 135, the transaction system may provide a fourth transaction message to the monitoring device. For example, the fourth transaction message may identify that the dispensing of gasoline has stopped. For example, assume that the dispensing of gasoline stopped four minutes after starting (e.g., outside of an expected timeframe associated with the third event). As shown by reference number 140, the monitoring device may update the first object and may detect a first alert.

An alert may identify that a transaction and/or an event associated with the transaction is abnormal. For example, the first object may generate an alert based on the third event being associated with an unexpected timeframe (e.g., greater than two minutes). For example, the monitoring device may compare a first time (e.g., associated with the start of the third event) with a second time (e.g., associated with the end of the third event), and may detect an alert based on comparing the first time and the second time. Additionally, the first object may transition to a fourth state that identifies that the first transaction is associated with the fourth event.

Figure 1E:
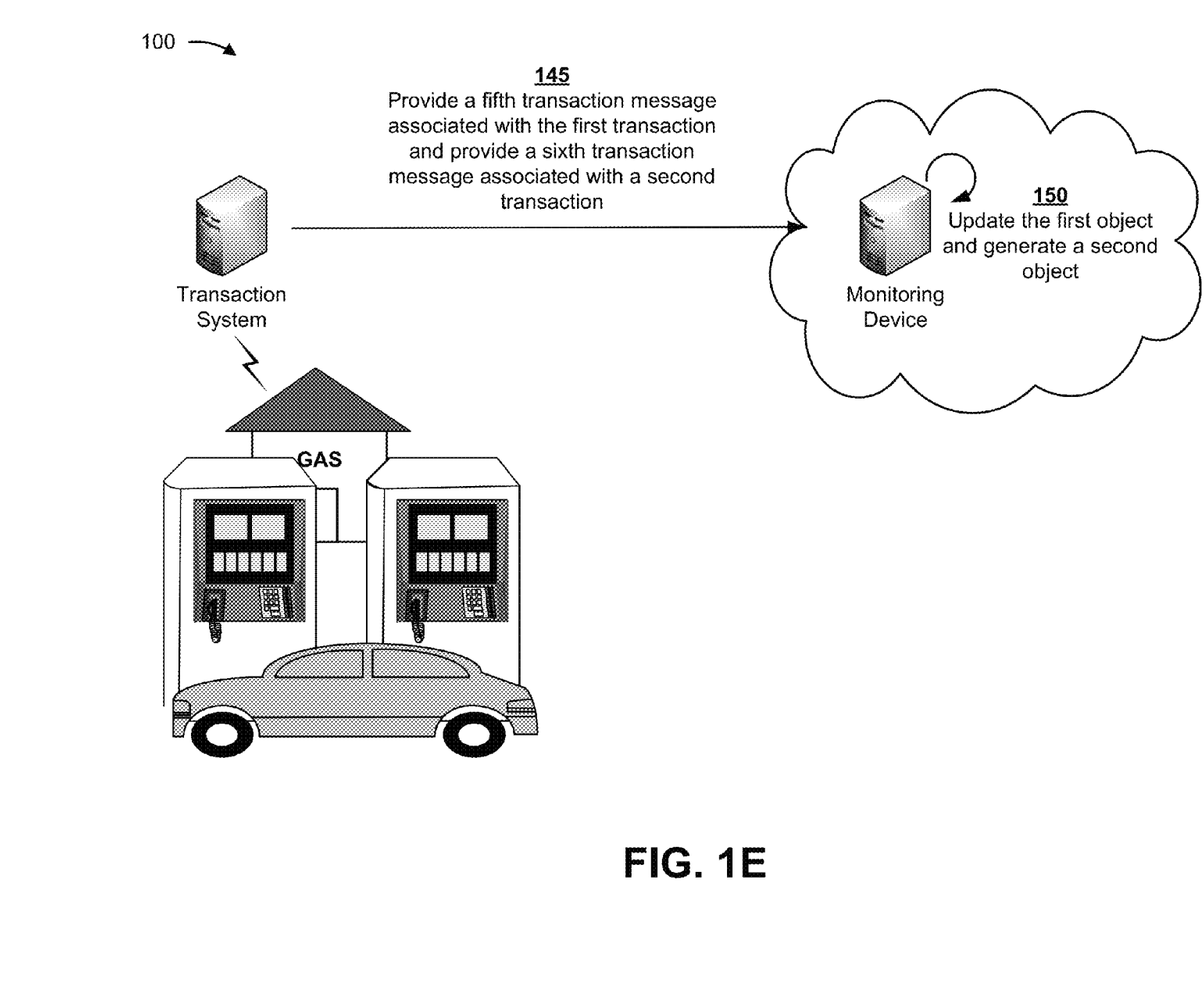

As shown in FIG. 1E, assume that the vehicle leaves the gas pump, and that another vehicle arrives at the same gas pump. As shown by reference number 145, the transaction system may provide a fifth transaction message associated with the first transaction (e.g., information that identifies that the first transaction has been completed). As further shown by reference number 145, the transaction system may provide a sixth transaction message to the monitoring device. For example, the sixth transaction message may include information that identifies that a second transaction has started.

As shown by reference number 150, the monitoring device may update the first object (e.g., the first object may be associated with a fifth state that identifies that the transaction is completed). As further shown by reference number 150, the monitoring device may generate a second object to monitor the second transaction.

Figure 1F:
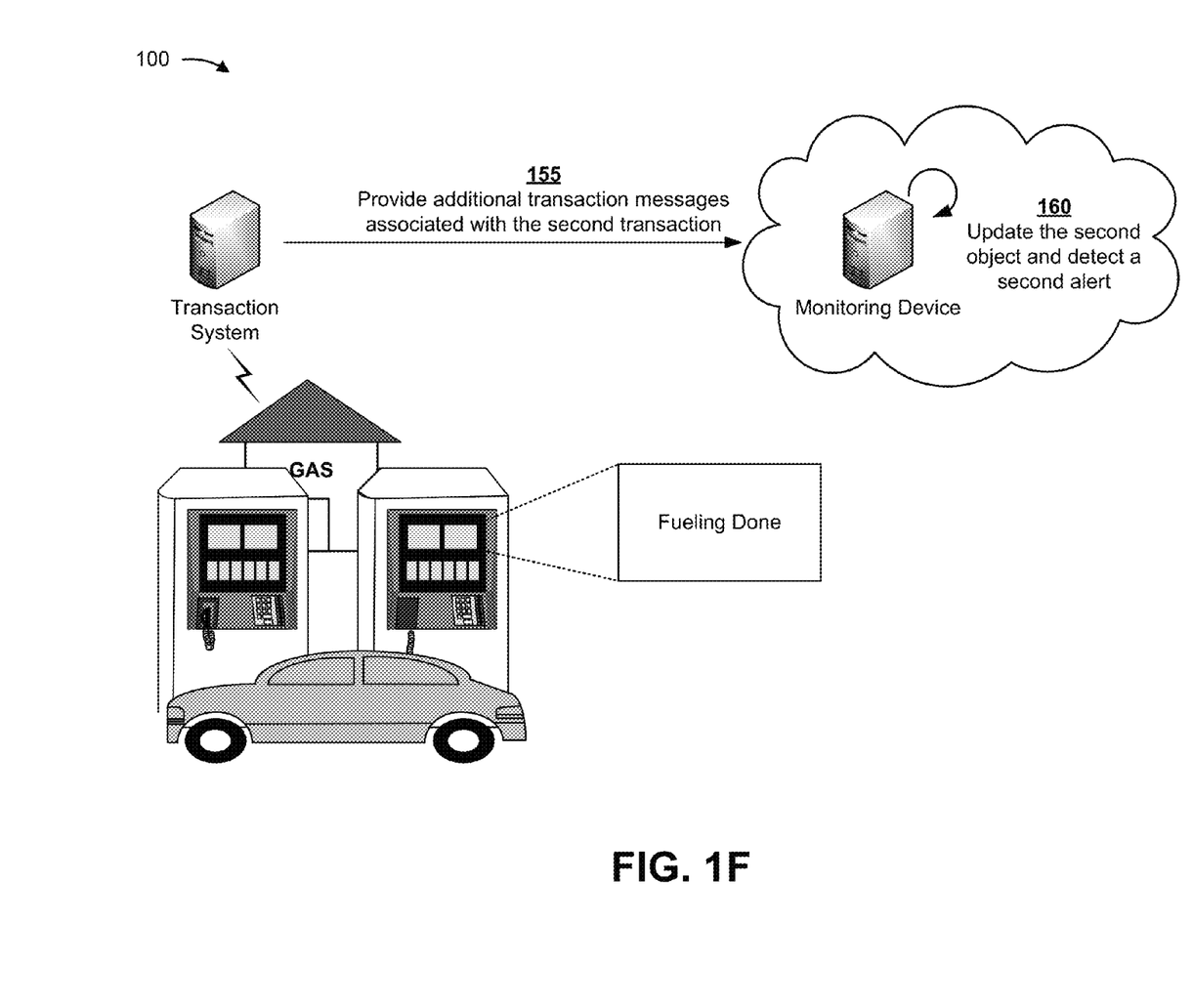

As shown in FIG. 1F, and by reference number 155, the transaction system may provide additional transaction messages associated with the second transaction. For example, assume that the transaction system provides transaction messages in a similar manner as described in connection with the first transaction. As shown by reference number 160, the monitoring device may update the second object and detect a second alert. For example, assume that the monitoring device determines that the third event associated with the second transaction (e.g., the dispensing of gasoline) is associated with an unexpected timeframe (e.g., greater than two minutes).

Figure 1G:
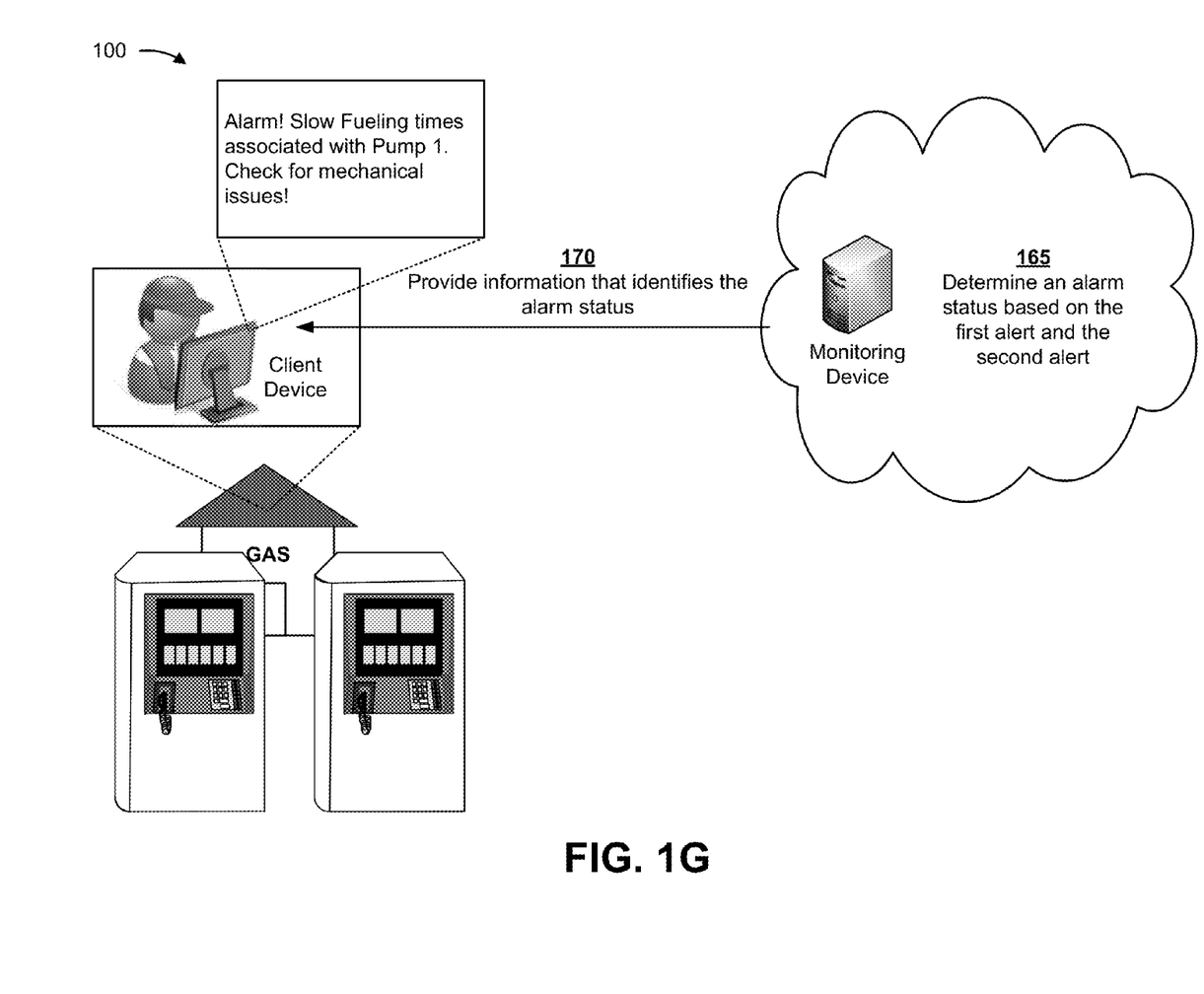

As shown in FIG. 1G, and by reference number 165, the monitoring device may determine an alarm status based on the first alert and the second alert. For example, the monitoring device may determine that both the first alert and the second alert are associated with the third event, and that an underlying issue may be prevalent. As shown by reference number 170, the monitoring device may provide, to a client device (e.g., a desktop computer), information that identifies the alarm status. For example, the monitoring device may identify a message associated with the first alert and the second alert (e.g., based on stored information), and may provide the message to the client device. In this way, the client device may provide the message for display (e.g., via a user interface, which may allow a user (e.g., a system administrator) to detect an issue associated with the transaction system. Alternatively, the monitoring device may perform an action, such as causing the gas pump to be rebooted, causing software associated with the gas pump to be upgraded, or the like.

Implementations described herein may assist a monitoring device in monitoring a transaction and detecting deviations from an expected sequence of events and/or an expected timeframe. Implementations described herein may assist a monitoring device in providing information that identifies issues associated with transactions, which may allow underlying issues associated with a system to be rectified. In this way, implementations described herein may conserve processor and/or memory resources associated with system devices by reducing issues associated with the system.

While the example above related to a monitoring device associated with a transaction system for a gas station, implementations, described herein, also relate to monitoring devices associated with other types of transaction systems. For example, implementations described herein may relate to an advertising campaign transaction system, a key management transaction system, an application programming interface (API) management transaction system, a customer management transaction system, a network monitoring system, or the like.

As indicated above, FIGS. 1A-1G are provided merely as an example. Other examples are possible and may differ from what was described with regard to FIGS. 1A-1G.

Figure 2:
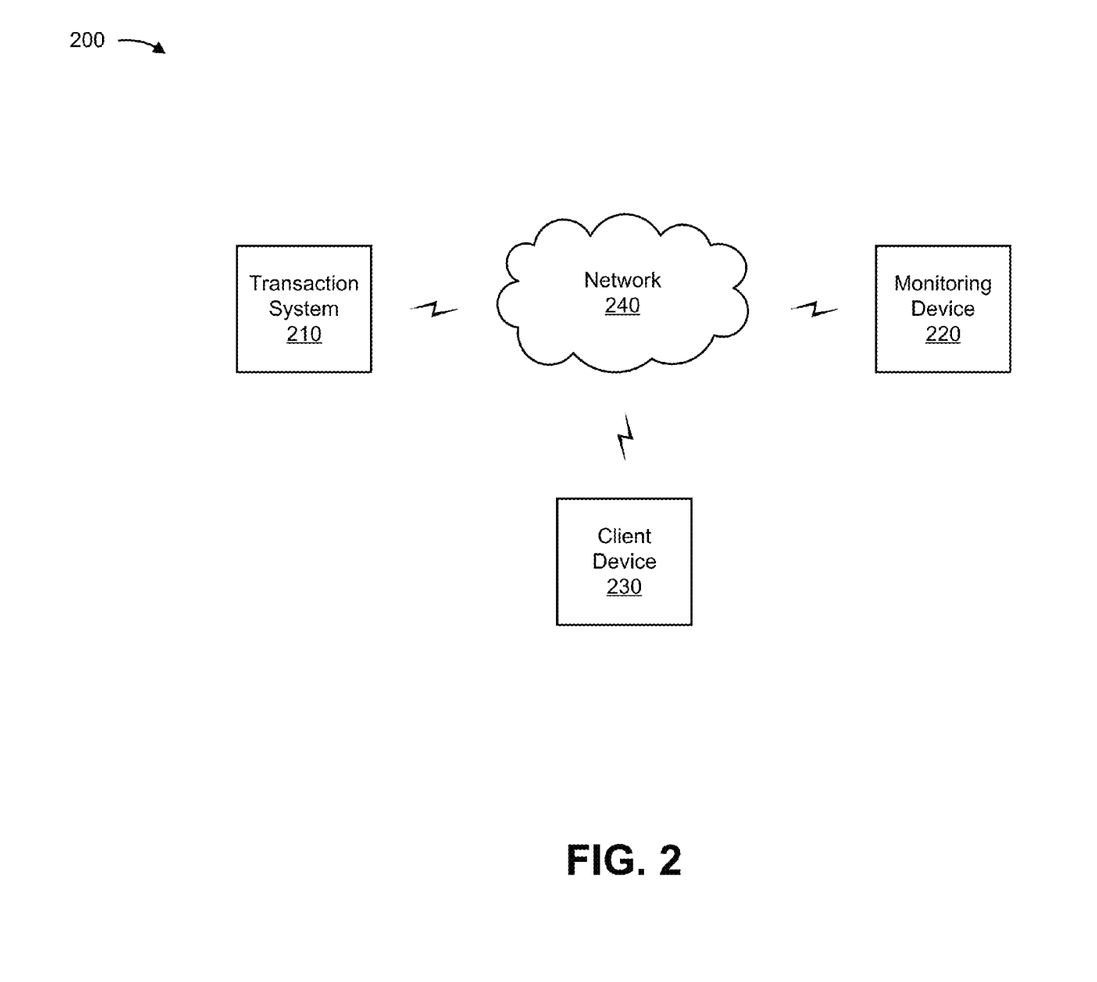
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a transaction system 210, a monitoring device 220, a client device 230, and a network 240. Devices of environment 200 may interconnect via wired connections, wireless connections, or a combination of wired and wireless connections.

Transaction system 210 includes one or more devices capable of receiving, generating, storing, processing, and/or providing information associated with a transaction. For example, transaction system 210 may include a mobile phone (e.g., a smart phone or a radiotelephone), a tablet computer, a handheld computer, a laptop computer, a desktop computer, a wearable communication device (e.g., a smart wristwatch or a pair of smart eyeglasses), a set-top box, a Machine-to-Machine (M2M) device, a server device (e.g., a web server, a proxy server, and/or a content server), a base station, a traffic transfer device (e.g., a router, a switch, a firewall, a hub, a bridge, a gateway, a modem, a network interface card (NIC), an optical add-drop multiplexer (OADM), a reconfigurable optical add-drop multiplexer, a server, and/or another device capable of transmitting, receiving, transferring, and/or processing network traffic, or a combination of two or more of the above-mentioned devices. Additionally, transaction system 210 may include any device with a processor, a memory, and a communication device. For example, transaction system 210 may include any "thing" in the Internet of Things (IoT).

Monitoring device 220 includes one or more devices capable of receiving, generating, storing, processing, and/or providing information associated with a transaction. For example, monitoring device 220 may include a computing device, such as a server device (e.g., a cloud server, a content server, a web server, a host server, and/or a database server), or the like. Monitoring device 220 may receive transaction information from transaction system 210, may generate an object associated with the transaction, may update the object, or the like. Additionally, monitoring device 220 may detect an alert associated with an object, and may determine an alarm status. In some implementations, monitoring device 220 may provide information associated with the alarm status to client device 230, and may permit and/or cause an action to be performed based on the alert status.

In some implementations, monitoring device 220 may include a container module that generates and/or stores objects, provides transaction messages to objects, and receives alerts from objects. Additionally, or alternatively, monitoring device 220 may include an object generation module that determines a condition for generating an object. Additionally, or alternatively, monitoring device 220 may include an object module that receives transaction messages from transaction system 210, and determines whether an alert is to be provided based on the transaction messages and timing messages. Additionally, or alternatively, monitoring device 220 may include an object message module that provides transaction messages to objects.

Client device 230 includes one or more devices capable of receiving, generating, storing, processing, and/or providing information associated with an alarm status. For example, client device 230 may include a computing device, such as a desktop computer, a laptop computer, a tablet computer, a server device, a mobile phone (e.g., a smart phone or a radiotelephone), or a similar type of device. Client device 230 may receive information that identifies an alarm status and may provide the information for display via a user interface.

Network 240 may include one or more wired and/or wireless networks. For example, network 240 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
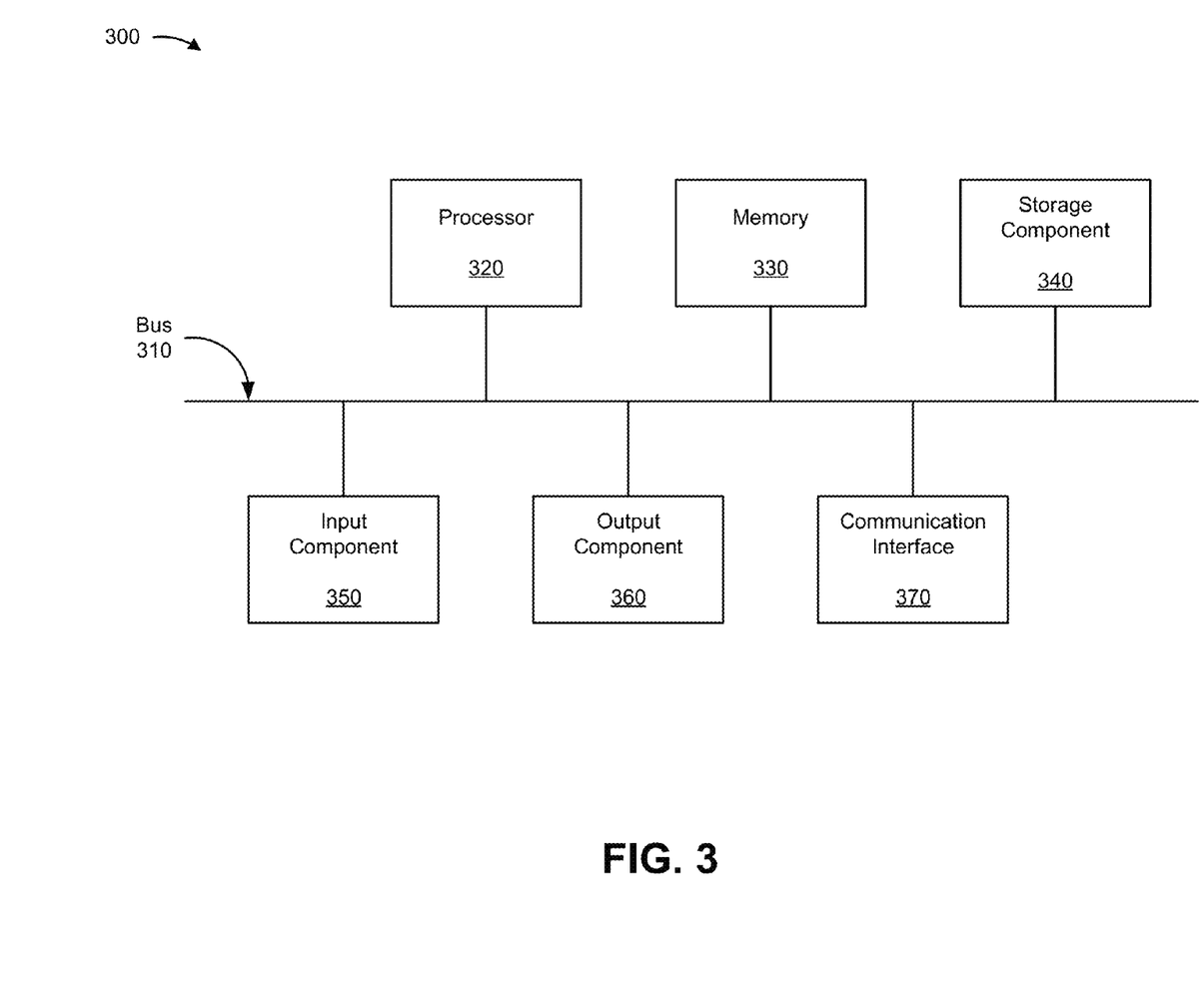
FIG. 3 is a diagram of example components of one or more devices of FIG. 2.

FIG. 3 is a diagram of example components of a device 300. Device 300 may correspond to transaction system 210, monitoring device 220, and/or client device 230. In some implementations, transaction system 210, monitoring device 220, and/or client device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
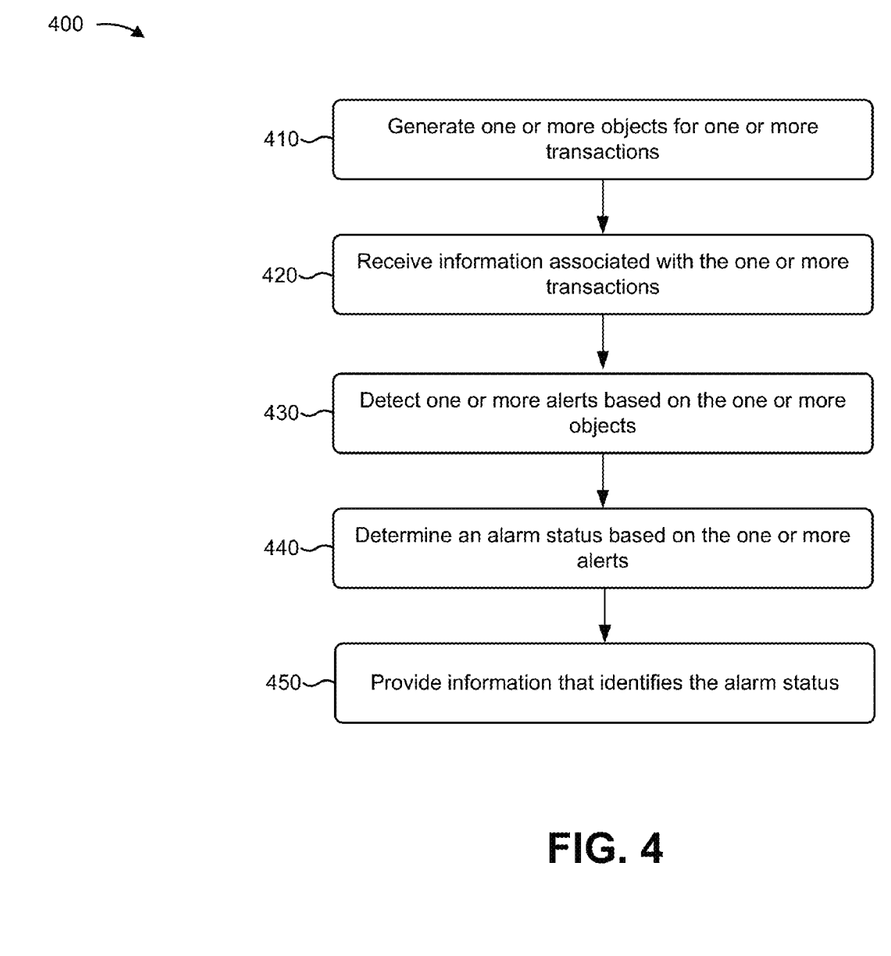
FIG. 4 is a flow chart of an example process for monitoring a transaction.

FIG. 4 is a flow chart of an example process 400 for monitoring a transaction. In some implementations, one or more process blocks of FIG. 4 may be performed by monitoring device 220. In some implementations, one or more process blocks of FIG. 4 may be performed by another device or a group of devices separate from or including monitoring device 220, such as transaction system 210 and/or client device 230.

As shown in FIG. 4, process 400 may include generating one or more objects for one or more transactions (block 410). For example, monitoring device 220 may generate an object for a transaction associated with transaction system 210. In some implementations, a transaction may include a sequence of one or more events. Additionally, or alternatively, a transaction may be associated with a particular sequence of events. Additionally, or alternatively, a transaction may be associated with a particular timeframe (e.g., an overall timeframe). Additionally, or alternatively, each event may be associated with a respective timeframe.

In some implementations, a transaction may be normal. For example, a normal transaction may include a sequence of events that occur in an expected order, that occur within an expected timeframe and/or expected respective timeframes, or the like. Additionally, or alternatively, a respective one or more events, in a normal transaction, may occur within an expected timeframe associated with the respective event. In some implementations, a transaction may be abnormal. For example, an abnormal transaction may include a sequence of events that occur in an unexpected order, that occur outside of a particular timeframe, or the like. Additionally, or alternatively, one or more events, in an abnormal transaction, may not occur within an expected timeframe and/or may not occur.

In some implementations, an object may include a data structure (e.g., a state machine, such as a finite-state automaton) that is capable of being associated with one or more states. Additionally, or alternatively, an object may include one or more states that correspond to a sequence of events associated with a transaction. For example, an object may include one or more states for each event associated with a transaction.

In some implementations, monitoring device 220 may generate an object based on receiving transaction information from transaction system 210. For example, transaction information may include information that identifies that a transaction has started, ended, or the like. Additionally, or alternatively, transaction information may include information that identifies that an event, associated with a transaction, has started, ended, or the like. In some implementations, transaction system 210 may provide, to monitoring device 220, a message that includes transaction information. In some implementations, the transaction information may include information that identifies a time associated with an event (e.g., a time stamp).

In some implementations, monitoring device 220 may generate an object based on a configuration parameter. For example, a configuration parameter may indicate a particular quantity of objects that may be associated with transaction system 210 (e.g., a quantity of transactions that may be monitored by monitoring device 220), a condition for generating an object, or the like. In this way, monitoring device 220 may monitor a transaction based on an object (e.g., based on a state of the object).

As further shown in FIG. 4, process 400 may include receiving information associated with the one or more transactions (block 420). For example, monitoring device 220 may receive, from transaction system 210, transaction information associated with the one or more transactions. In some implementations, monitoring device 220 may update an object based on receiving transaction information. For example, monitoring device 220 may identify an object associated with the transaction information, and may update the object based on the transaction information.

In some implementations, transaction information may cause an object to update a state. For example, an object may include one or more states that correspond to each event associated with a transaction. In some implementations, an object may transition between states based on receiving transaction information. For example, assume that a transaction includes two events. In this case, an object may include a state associated with the first event and a state associated with the second event. In some implementations, an object may be associated with a normal state. For example, a normal state may indicate that the transaction is normal (e.g., the transaction is occurring in an expected sequence and/or occurring within an expected timeframe). Additionally, or alternatively, an object may be associated with an abnormal state. For example, an abnormal state may indicate that the transaction is abnormal (e.g., the transaction is occurring in an unexpected sequence and/or occurring outside of an expected timeframe). In this way, monitoring device 220 may detect an alert based on an abnormal state associated with an object, as described below.

As further shown in FIG. 4, process 400 may include detecting one or more alerts based on the one or more objects (block 430). For example, monitoring device 220 may detect an alert based on a state associated with an object. In some implementations, monitoring device 220 may detect an alert based on an object being associated with an abnormal state. In some implementations, an alert may identify that an object is associated with an abnormal state. In some implementations, an object may generate an alert based on being associated with an abnormal state, and monitoring device 220 may detect the alert based on the object generating the alert.

In some implementations, monitoring device 220 may receive, from transaction system 210, transaction information, and may update an object associated with a transaction. In some implementations, monitoring device 220 may detect an alert based on an object being associated with a state that indicates that the transaction is occurring in an unexpected sequence. Additionally, or alternatively, monitoring device 220 may detect an alert based on an object being associated with a state that indicates that an event occurred outside of an expected timeframe. For example, monitoring device 220 may determine that an object was associated with a particular state for an unexpected timeframe. In some implementations, monitoring device 220 may compare a first time (e.g., a start time) associated with a particular state of an object with a second time (e.g., an end time) associated with the particular state. Additionally, or alternatively, monitoring device 220 may determine that the object was associated with the particular state for an unexpected timeframe based on comparing the first time and the second time.

In some implementations, monitoring device 220 may detect an alert based on an object being associated with a state for a particular timeframe. For example, monitoring device 220 may determine that an object is associated with a particular state, and may determine that the object should be associated with another state. In some implementations, monitoring device 220 may provide timing data (e.g., information that includes a time stamp and/or identifies a time) to an object. Additionally, or alternatively, an object may receive timing data and may compare a time associated with the timing data with a time associated with a particular state of the object (e.g., a start time associated with the state). Additionally, or alternatively, an object may generate an alert based on comparing a time, associated with the timing data, with a time associated with the particular state of the object. In this way, monitoring device 220 may detect an alert based on a non-occurrence of an event associated with a transaction.

In some implementations, an object may be associated with multiple abnormal states. For example, assume that a transaction includes three events. In this case, an object associated with the transaction may include states associated with each of the three events. For example, if multiple events associated with the transaction are abnormal, then the object may include multiple abnormal states. In some implementations, the object may generate multiple alerts corresponding to the multiple abnormal states. In some implementations, the object may generate a single alert corresponding to the multiple abnormal states.

As further shown in FIG. 4, process 400 may include determining an alarm status based on the one or more alerts (block 440). For example, monitoring device 220 may determine an alarm status based on the one or more alerts associated with the one or more objects. In some implementations, an alarm status may identify an issue associated with transaction system 210 (e.g., indicating that one or more transactions associated with transaction system 210 are abnormal). For example, monitoring device 220 may identify each transaction associated with transaction system 210, and may identify one or more alerts associated with each transaction.

In some implementations, monitoring device 220 may determine an alarm status based on a quantity of objects, that are associated with an abnormal state, satisfying a threshold. In this way, monitoring device 220 may reduce a quantity of false alarms based on identifying that a particular quantity of objects are associated with an abnormal state, thereby conserving processor, memory, and/or network resources by reducing a quantity of alarm processing and/or messaging.

Additionally, or alternatively, monitoring device 220 may determine an alarm status based on one or more objects being associated with an abnormal state at a rate that satisfies a threshold. In this way, monitoring device 220 may allow a developing issue to be rectified, thereby conserving processor and/or memory resources associated with devices of transaction system 210.

Additionally, or alternatively, monitoring device 220 may determine an alarm status based on an object being associated with a quantity of abnormal states that satisfies a threshold. In this way, monitoring device 220 may determine an alarm status based on multiple alerts, thereby reducing a quantity of errors in detecting alarm statuses (e.g., producing false alarms). In this way, network resources may be conserved by reducing a quantity of alarm messages that monitoring device 220 provides to transaction system 210. Additionally, processor and/or memory resources may be conserved based on reducing a quantity of alarm processing.

In some implementations, monitoring device 220 may assign particular weights (e.g., values) to different alerts associated with a transaction when determining an alarm status. For example, assume that a transaction includes a first event and a second event. In this case, monitoring device 220 may assign a first value to an alert associated with the first event, and may assign a second value to an alert associated with the second event. Additionally, or alternatively, monitoring device 220 may combine values associated with one or more objects when determining the alarm status. In this way, monitoring device 220 may determine an alarm status based on a particular importance of an event or events.

In addition to the above, monitoring device 220 may determine an alarm status based on a parameter associated with a transaction. For example, monitoring device 220 may determine an alarm status based on alerts associated with a particular geographic location (e.g., a geographic area), a particular time (e.g., a time of day, a particular day, or a particular week), a particular device (e.g., a device associated with transaction system 210), a particular user (e.g., a customer or a type of customer), a particular event, or the like.

As further shown in FIG. 4, process 400 may include providing information that identifies the alarm status (block 450). For example, monitoring device 220 may provide, to client device 230 and/or transaction system 210, information (e.g., a message, such as an email, a short message service (SMS) message, or a notification) that identifies the alarm status. In some implementations, monitoring device 220 may provide information, that identifies the alarm status, which may permit and/or cause an action to be performed.

In some implementations, monitoring device 220 may provide information that identifies the one or more alerts. For example, monitoring device 220 may store information (e.g., in a data structure, such as table) that associates an alert (e.g., associated with a particular event) with a particular message to be provided to client device 230. In this way, monitoring device 220 may provide information (e.g., a message) that identifies a particular event, or events, associated with the alarm status. Additionally, client device 230 may receive the information and may present the information for display (e.g., via a user interface). In this way, a user (e.g., a system administrator, manager, or engineer) may identify a particular issue associated with transaction system 210.

In some implementations, monitoring device 220 may permit and/or cause an action to be performed based on determining an alarm status. For example, monitoring device 220 may perform an action and/or may cause another device to perform an action based on determining an alarm status. In some implementations, monitoring device 220 may cause a device, associated with transaction system 210, to reboot, to upgrade software, or the like. Additionally, or alternatively, monitoring device 220 may cause another device to modify a configuration, perform another task associated with the transaction, or the like. In this way, monitoring device 220 may detect an underlying issue, and may rectify the issue by causing an action to be performed. Thereby, processor and/or memory resources associated with devices of transaction system 210 may be conserved by reducing a quantity of time associated with an issue.

In some implementations, monitoring device 220 may coordinate client devices 230 (e.g., coordinate calendar applications associated with client devices 230 to schedule a meeting or to schedule a repair), and may provide information identifying the alarm status. In this way, a user may receive an indication that a meeting has been scheduled to discuss an issue associated with the alarm status. Additionally, a quantity of time associated an issue relating to transaction system 210 may be reduced, thereby conserving processor and/or memory resources of devices associated with transaction system 210.

Additionally, or alternatively, monitoring device 220 may cause another device (e.g., a network device, such as a router or a firewall) to modify network traffic. For example, monitoring device 220 may cause another device to re-route network traffic, to implement a security feature (e.g., filter ingress and/or egress traffic), or the like. In this way, monitoring device 220 may cause another device to modify network traffic associated with a problematic device of transaction system 210. Additionally, network, processor, and/or memory resources may be conserved by preventing network traffic from being associated with a problematic device of transaction system 210.

Implementations described herein may assist a monitoring device in monitoring a transaction and detecting an issue with a transaction system. Additionally, implementations described herein may assist a monitoring device in providing information that identifies a particular issue to another device for display, such that a user may identify the particular issue. Implementations described herein may reduce a quantity of time associated with a transaction system issue, thereby conserving processor, memory, and/or network resources associated with a transaction system.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may reduce a quantity of issues associated with transaction system devices. Thereby, implementations described herein may conserve transaction system device processor and/or memory resources, and may conserve network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
generate one or more objects for one or more transactions,
the one or more transactions including a sequence of one or more events,
the one or more objects including one or more states associated with the sequence of one or more events;
receive information associated with the one or more transactions,
the information being associated with the one or more events,
the information being used to update the one or more states of the one or more objects;
detect one or more alerts based on the one or more objects, the one or more alerts being associated with the one or more states of the one or more objects, the one or more states of the one or more objects being updated based on receiving the information associated with the one or more transactions;

determine an alarm status based on the one or more alerts; and provide, based on the alarm status, information to cause an action to be performed.

2. The device of claim 1, where the one or more processors are further to:

determine that a quantity of alerts, of the one or more alerts, satisfies a threshold; and where the one or more processors, when determining the alarm status based on the one or more alerts, are to:

determine the alarm status based on the quantity of alerts satisfying the threshold.

3. The device of claim 1, where the one or more processors are further to:

determine that a rate of alerts, of the one or more alerts, satisfies a threshold; and where the one or more processors, when determining the alarm status based on the one or more alerts, are to:

determine the alarm status based on the rate of alerts satisfying the threshold.

4. The device of claim 1, where the one or more processors are further to:

identify a message associated with the alarm status; and where the one or more processors, when providing the information that identifies the alarm status, are to:

provide the message to another device for display.

5. The device of claim 1, where the one or more processors are further to:

determine that a quantity of alerts, of the one or more alerts, associated with a particular geographic location satisfies a threshold; and where the one or more processors, when determining the alarm status, are to:

determine the alarm status based on the quantity of alerts associated with the particular geographic location satisfying the threshold.

6. The device of claim 1, where the one or more processors are further to:

determine that the one or more objects are associated with a first sequence of states, of the one or more states, that does not match a second sequence of states; and where the one or more processors, when detecting the one or more alerts, are to:

detect the one or more alerts based on determining that the one or more objects are associated with the first sequence of states that does not match the second sequence of states.

7. The device of claim 1, where the one or more processors are further to:

determine that the one or more objects are associated with one or more states for a time outside of a particular timeframe; and where the one or more processors, when detecting the one or more alerts, are to:

detect the one or more alerts based on determining that the one or more objects are associated with the one or more states for the time outside of the particular timeframe.

8. A non-transitory computer-readable medium storing instructions, the instructions comprising:

one or more instructions that, when executed by one or more processors of a device, cause the one or more processors to:

generate a plurality of objects for a plurality of transactions, the plurality of transactions including a sequence of events, the plurality of objects including a plurality of states associated with the sequence of events;

receive information associated with the plurality of transactions, the information being associated with the sequence of events, the information being used to update the plurality of states of the plurality of objects;

detect a plurality of alerts based on the plurality of objects, the plurality of objects being associated with the plurality of alerts based on receiving the information associated with the plurality of transactions;

determine an alarm status based on the plurality of alerts; and provide information to permit an action to be performed based on the alarm status.

9. The non-transitory computer-readable medium of claim 8, where the one or more instructions, when executed by the one or more processors, further cause the one or more processors to:

determine that a quantity of alerts, of the plurality of alerts, satisfies a threshold; and where the one or more instructions, that cause the one or more processors to determine the alarm status, cause the one or more processors to:

determine the alarm status based on the quantity of alerts satisfying the threshold.

10. The non-transitory computer-readable medium of claim 8, where the one or more instructions, when executed by the one or more processors, further cause the one or more processors to:

determine that a rate of alerts, of the plurality of alerts, satisfies a threshold; and where the one or more instructions, that cause the one or more processors to determine the alarm status, cause the one or more processors to:

determine the alarm status based on the rate of alerts satisfying the threshold.

11. The non-transitory computer-readable medium of claim 8, where the action includes modifying network traffic or causing another device to perform an operation relating to the alarm status.

12. The non-transitory computer-readable medium of claim 8, where the one or more instructions, when executed by the one or more processors, further cause the one or more processors to:

compare a plurality of first times associated with the plurality of objects with a plurality of second times associated with the plurality of objects; and where the one or more instructions, that cause the one or more processors to detect the plurality of alerts, cause the one or more processors to:

detect the plurality of alerts based on comparing the plurality of first times with the plurality of second times.

13. The non-transitory computer-readable medium of claim 8, where the one or more instructions, when executed by the one or more processors, further cause the one or more processors to:

determine that the plurality of alerts are associated with a particular time; and where the one or more instructions, that cause the one or more processors to determine the alarm status, are to:
    determine the alarm status based on determining that the plurality of alerts are associated with the particular time.

14. The non-transitory computer-readable medium of claim 8, where the one or more instructions, when executed by the one or more processors, further cause the one or more processors to:
    assign a first plurality of values to a first type of alert, of the plurality of alerts;
    assign a second plurality of values to a second type of alert, of the plurality of alerts;
    combine the first plurality of values and the second plurality of values; and
    where the one or more instructions, that cause the one or more processors to detect the alarm status, cause the one or more processors to:
        detect the alarm status based on combining the first plurality of values and the second plurality of values.

15. A method, comprising:
    generating, by a device, a plurality of objects for a plurality of transactions,
        the plurality of transactions including a sequence of events,
        the plurality of objects including a plurality of states associated with the sequence of events;
    receiving, by the device, information associated with the plurality of transactions,
        the information being associated with the sequence of events;
    detecting, by the device, a plurality of alerts based on the plurality of objects,
        the plurality of alerts being associated with the information associated with the plurality of transactions, the plurality of alerts being associated with the plurality of states;
    determining, by the device, an alarm status based on the plurality of alerts; and
    providing, by the device, information that identifies the alarm status to permit an action to be performed based on the alarm status.

16. The method of claim 15, where one of the plurality of objects is a state machine.

17. The method of claim 15, further comprising:
    assigning a first plurality of values to a first type of alert, of the plurality of alerts;
    assigning a second plurality of values to a second type of alert, of the plurality of alerts; and
    where determining the alarm status comprises:
        determining the alarm status based on the first plurality of values and the second plurality of values.

18. The method of claim 15, further comprising:
    determining an event, of the sequence of events, associated with the plurality of alerts; and
    where determining the alarm status comprises:
        determining the alarm status based on determining the event.

19. The method of claim 15, further comprising:
    determining a geographic location associated with the plurality of transactions; and
    where providing information that identifies the alarm status comprises:
        providing information that identifies the geographic location along with the information that identifies the alarm status.

20. The method of claim 15, further comprising:
providing timing data to the plurality of objects; and
where detecting the plurality of alerts comprises:
    detecting the plurality of alerts based on providing the timing data to the plurality of objects.

* * * * *